US009111248B2

(12) United States Patent
Makhija et al.

(10) Patent No.: US 9,111,248 B2
(45) Date of Patent: Aug. 18, 2015

(54) PROCUREMENT SYSTEM

(75) Inventors: Subhash Makhija, Westfield, NJ (US);
Santosh Katakol, Mumbai (IN);
Dhananlay Nagalkar, Bridgewater, NJ
(US); Siddhaarth Iyer, Mumbai (IN);
Ravi Mevcha, Mumbai (IN)

(73) Assignee: Global eProcure, Clark, NJ (US)

( * ) Notice: Subject to any disclaimer, the term of this patent is extended or adjusted under 35 U.S.C. 154(b) by 571 days.

(21) Appl. No.: 13/432,727

(22) Filed: Mar. 28, 2012

(65) Prior Publication Data
US 2013/0262104 A1   Oct. 3, 2013

(51) Int. Cl.
*G10L 15/26* (2006.01)
*G06Q 10/08* (2012.01)
*G06F 17/30* (2006.01)
*G10L 15/18* (2013.01)

(52) U.S. Cl.
CPC ........ *G06Q 10/087* (2013.01); *G06F 17/30654* (2013.01); *G10L 15/1822* (2013.01); *G10L 15/26* (2013.01)

(58) Field of Classification Search
CPC ......... G06F 17/20; G06F 17/21; G06F 17/27;
G06F 17/2735; G06F 17/2765; G10L 15/00;
G10L 15/01; G10L 15/06; G10L 15/18;
G10L 15/1822; G10L 15/22; G10L 15/26;
G10L 15/265
USPC ......... 704/231, 235, 251, 9, 257, 243, 1, 4, 7, 704/10
See application file for complete search history.

(56) References Cited

U.S. PATENT DOCUMENTS

| 2004/0117189 A1* | 6/2004 | Bennett .................. 704/270.1 |
| 2009/0112835 A1* | 4/2009 | Elder ............................ 707/4 |
| 2010/0114944 A1* | 5/2010 | Adler et al. ................. 707/770 |

* cited by examiner

*Primary Examiner* — Qi Han
(74) *Attorney, Agent, or Firm* — David M. Breiner; Camille L. Urban

(57) ABSTRACT

A procurement system may include a first interface configured to receive a query from a user, a command module configured to parameterize the query, an intelligent search and match engine configured to compare the parameterized query with stored queries in a historical knowledge base and, in the event the parameterized query does not match a stored query within the historical knowledge base, search for a match in a plurality of knowledge models, and a response solution engine configured to receive a system response ID from the intelligent search and match engine, the response solution engine being configured to initiate a system action by interacting with sub-system and related databases to generate a system response.

5 Claims, 4 Drawing Sheets

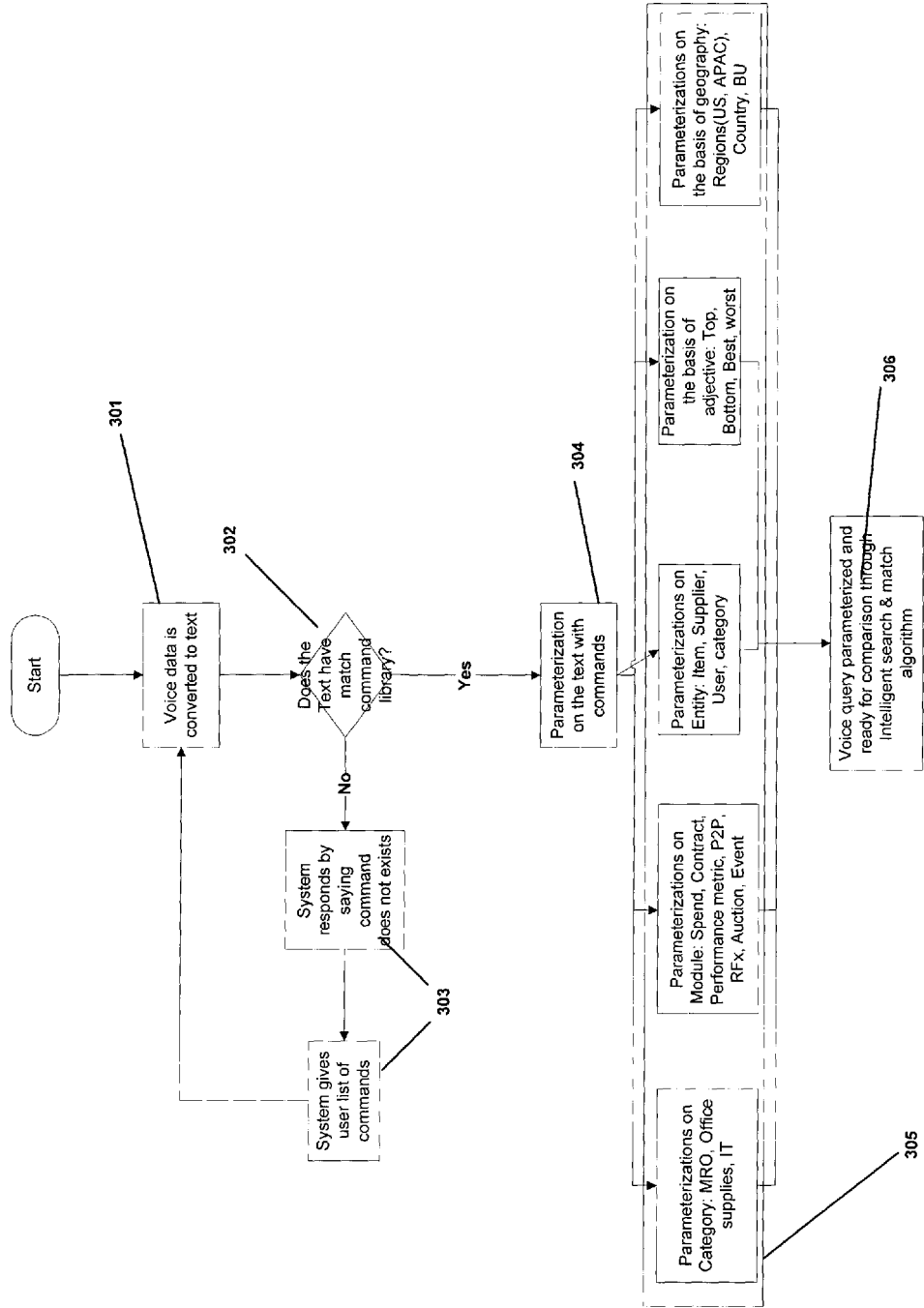

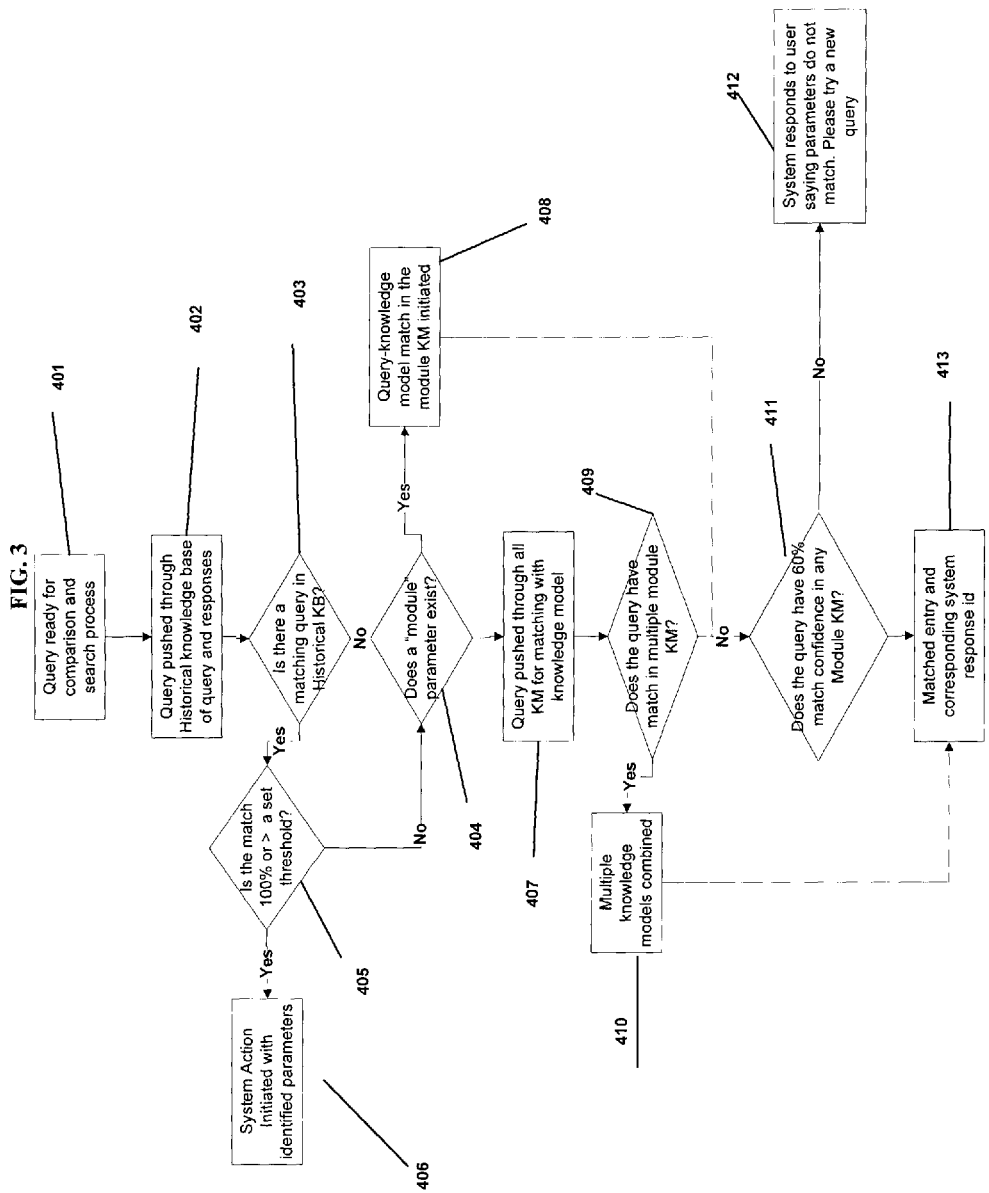

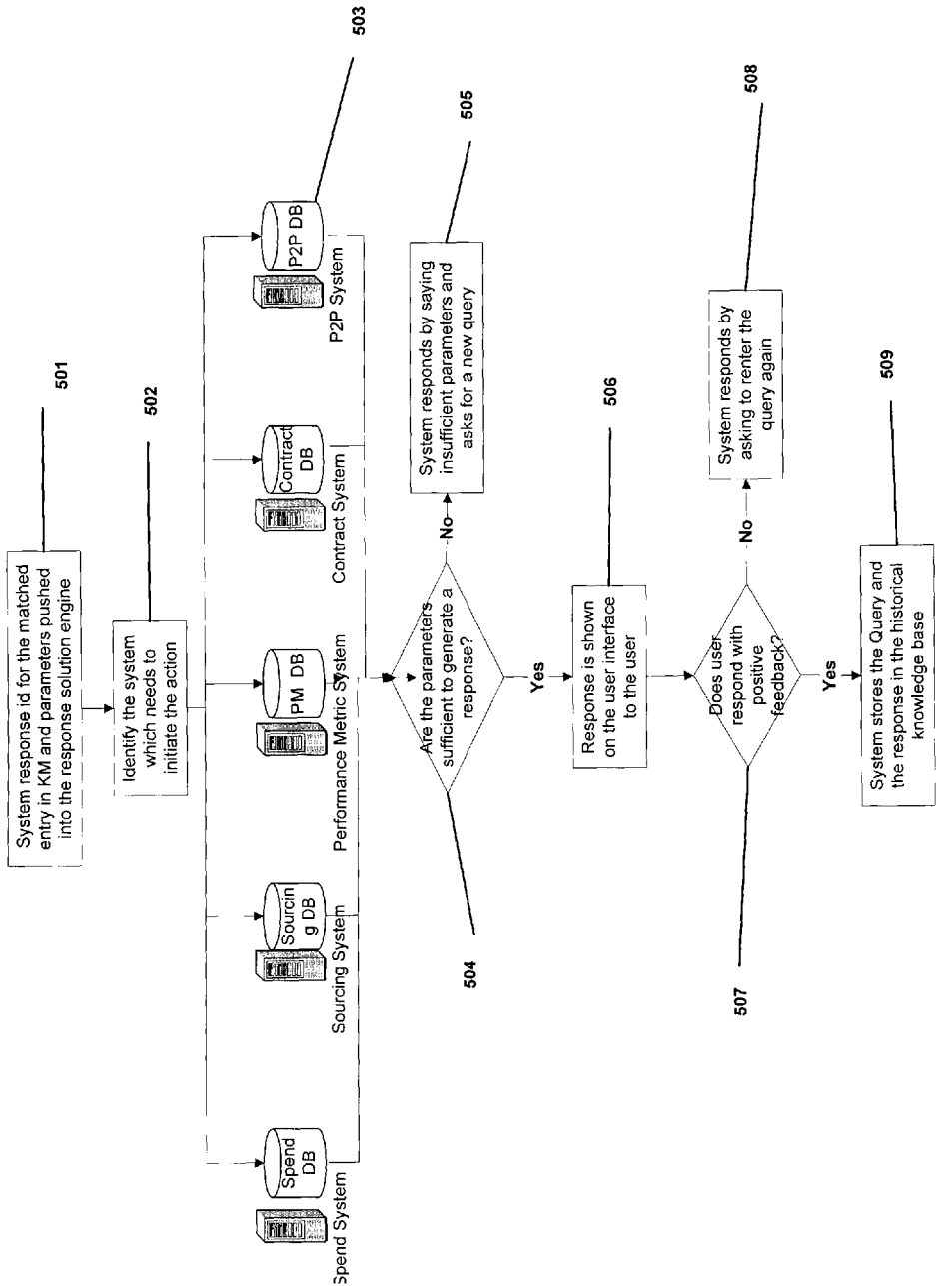

PROCUREMENT SYSTEM

BACKGROUND

1. Field

Example embodiments relate to a procurement system and, in particular, to a voice enabled procurement system.

2. Description of the Related Art

Business users using procurement systems typically retrieve information and act upon it to conduct a sourcing or procurement activity. The efficiency of conducting procurement operations through any system depends on the user's familiarity with the system and related data sources. The user also needs to understand the graphical user interfaces for using the system to seek information or make decisions. In effect, the speed with which the user is able to get information or perform an activity accurately is greatly determined by the user's knowledge of how to use the system and where to look for the specific information.

Consider an example of a user who wants to find the quarterly spend of a specific business unit on a specific category. The user needs to go into the spend system, find the category specific spend, then filter it by the specific business unit, and, finally, filter it based on the time period. The above steps need a user who knows the tool and, at the same time, understands the various data elements present in the system to derive the information that he/she is seeking.

Consider also problems associated with transactional activities related to procurement operations. Large organizations raise POs across various categories frequently. In this scenario, category buyers need to keep tab of their orders and interact with the suppliers regarding delivery and shipments. If a buyer wishes to pull out all the orders which have been partially invoiced for a particular category in a specific business unit, he would have to go through multiple steps involving filtering of information which is very cumbersome. Alternatively, a user needs to create a new report with the above mentioned constraints. For the latter, the user would again need to know the data elements which is not easily learned.

Consider also the problem a business user has in seeking information about the firm's exposure to a specific supplier across the globe. For large organizations, the number of contracts across various geographies, regions and categories would run in a few hundred thousand. In these cases the user needs to search for the contracts narrowing his search from geographies to regions to categories. This would be a lengthy process as the numbers could be very high.

SUMMARY

Example embodiments relate to a procurement system.

In accordance with example embodiments, a method for capturing a voice query through a personal computing device and parameterizing the voice query may include converting the voice query to text using a speech to text converter, analyzing the text and parsing the text into words, and referring to a command library to identify the words as one of commands and parameters, wherein the parameters include at least one of a category parameter, a module parameter, an adjective parameter, an entity parameter, and a region parameter. In example embodiments the above method may include a system that includes a processor, for example, microprocessor configured to implement the above steps.

In accordance with example embodiments, a method for building a query knowledge model using natural language based text may include forming an initial training set by compiling a collection of natural language text queries and corresponding system response information related to a sub system, and building the query knowledge model by analyzing and processing the collection of natural language text queries in the initial training set by: 1) searching a natural language text query of the collection of natural language text queries for at least one command word by comparing words in the natural language text query to a command library and, in the event a word in the natural language text query is identified as a command word, identifying the word as a command; 2) parameterizing additional words in the natural language text query as at least one of a category, a module, an adjective, an entity, and a region; 3) identifying a response ID of the natural language text query; 4) storing the command, the parameterized additional words, and the identified response ID as a record set of the query knowledge model, and 5) repeating the steps i-iv for each of the remaining natural language text queries of the collection of natural language text queries to create the query knowledge model based out of the initial training set. In example embodiments the above method may include a system that includes a processor, for example, microprocessor configured to implement the above steps.

In accordance with example embodiments, a method for building a historical knowledge base may include forming an initial training set by compiling a collection of natural language text queries and corresponding system response information, and building the historical knowledge base query knowledge model by analyzing and processing the collection of natural language text queries in the initial training set by: 1) searching a natural language text query of the collection of natural language text queries for at least one command word by comparing words in the natural language text query to a command library and, in the event a word in the natural language text query is identified as a command word, identifying the word as a command; 2) parameterizing additional words in the natural language text query as at least one of a category, a module, an adjective, an entity, and a region; 3) identifying a response ID of the natural language text query; 4) storing the command, the parameterized additional words, and the identified response ID as a record set of the historical knowledge base; and 5) repeating steps 1-4 for each of the remaining natural language text queries of the collection of natural language text queries to create the historical knowledge base based out of the initial training set. In example embodiments the above method may include a system that includes a processor, for example, microprocessor configured to implement the above steps.

In accordance with example embodiments, a method for intelligent comparison and matching of a voice query with a knowledge model specific to a module of the of a procurement system, to identify a system response for the voice query, the method may include determining the voice query has a word associated with a Module parameter, initiating comparison and matching operations on a module specific knowledge model, performing matches between parameter of the voice query and entries of with the module specific knowledge model and rating the matches to assign a match confidence level, determining a short list of potential matches based on a threshold match confidence level, in case of multiple potential matches, selecting the match with the highest confidence level as a best match, and selecting the response ID associated with the best match and passing it to a response solution engine. In example embodiments the above method may include a system that includes a processor, for example, microprocessor configured to implement the above steps.

In accordance with example embodiments, a method for intelligent comparison and matching of a voice query with a plurality of knowledge models, to identify a system response for the voice query, may include determining the voice query does not have a word associated with a Module parameter, initiating comparison and matching operations on the plurality of module specific knowledge models, performing matches with the each of the module knowledge models and rating the matches to assign a match confidence level, determining a short list of potential matches from the plurality of knowledge models based on a threshold match confidence level, in case of multiple potential matches, selecting a match with the highest confidence level as a best match, and selecting the response ID associated with the best match and passing it to a response solution engine. In example embodiments the above method may include a system that includes a processor, for example, microprocessor configured to implement the above steps.

In accordance with example embodiments, a method to initiate a system response based on a system response ID and voice query parameters, may include identifying a procurement sub system or a combination of the sub systems corresponding to the system response ID, identifying sub system specific pre-built action methods and parameters corresponding to the system response ID, and initiating a system response by executing the pre-built action method by passing the voice query parameters to the pre-built method of the sub system. In example embodiments the above method may include a system that includes a processor, for example, microprocessor configured to implement the above steps.

BRIEF DESCRIPTION OF THE DRAWINGS

Example embodiments are described in detail below with reference to the attached drawing figures, wherein:

FIG. 2 is a view of a command library process in accordance with example embodiments;

FIG. 3 is a view a knowledge model process in accordance with example embodiments; and FIG. 4 is a system view of a process that may be executed by a response solution engine in accordance with example embodiments.

DETAILED DESCRIPTION

Figure 1:
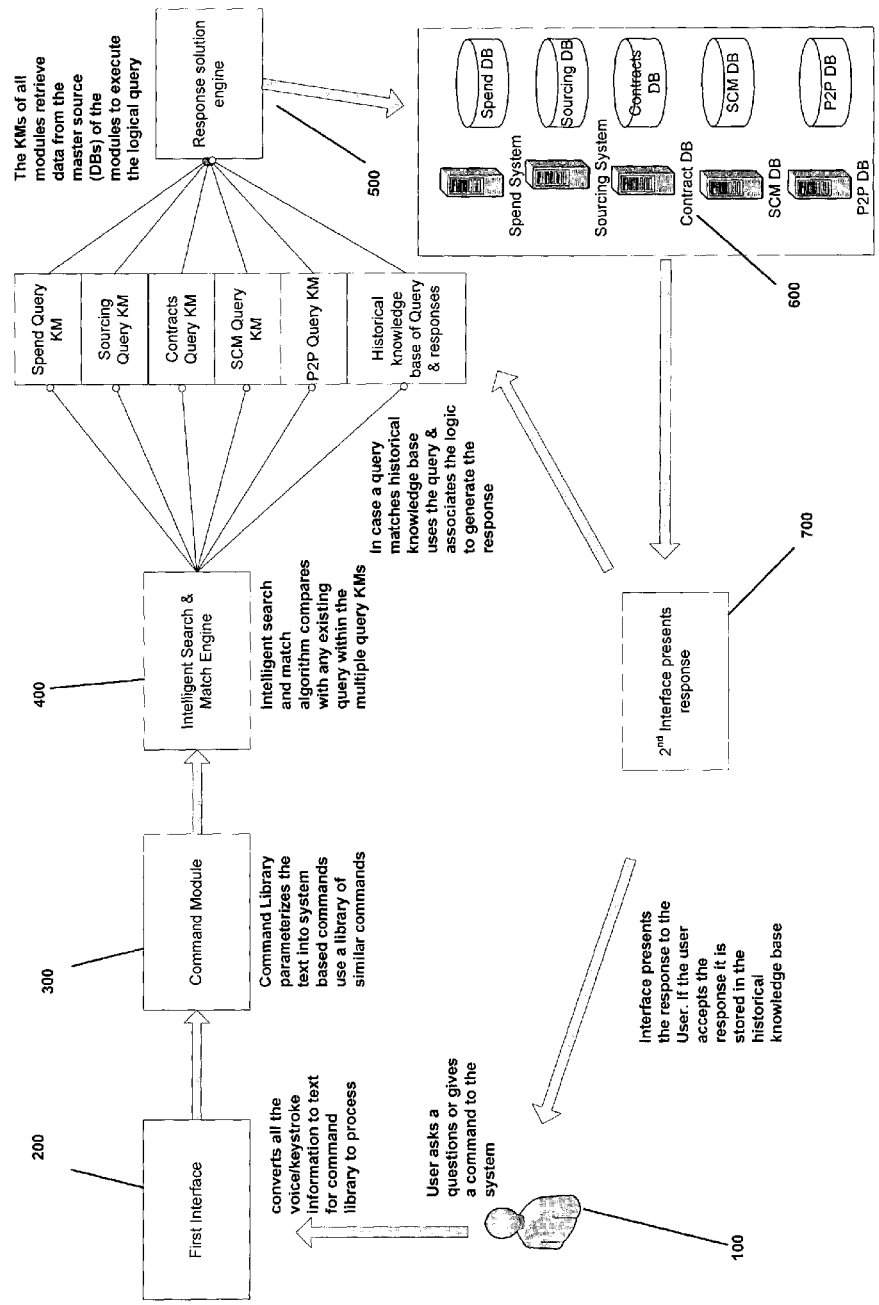
FIG. 1 is a system view of a procurement system in accordance with example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments of the invention relate to a procurement system.

FIG. 1 illustrates an example of a procurement system according to example embodiments. In example embodiments, the procurement system may include a first interface 200, a command module 300, an intelligent search and match engine 400, a response solution engine 500, a plurality of databases 600, and a second interface 700. In example embodiments, the first interface 200 may be configured to interface with a user 100 and may be configured to convert information from the user 100 into data which is usable by the procurement system. For example, in example embodiments, the first interface 200 may include a voice-to-text converter which may be configured to convert voice information, for example, from the user 100, to text information which may be usable by the procurement system. Example embodiments, however, are not limited thereto. For example, rather than providing a voice-to-text converter, the first interface 200 may be a keyboard into which information (for example, commands or queries) may be typed. The first interface 200 may then convert the typed information into data which is usable by the procurement system. For example, the first interface 200 may convert the signals from the keyboard to text which may be usable by the procurement system. Additionally, the interface may include both a voice-to-text converter and a keyboard. For example, in the event a user has an accent or a speech defect that makes is difficult for the voice-to-text converter to accurately convert voice to text, or when a user is in an environment that generates too much noise for the voice-to-text converter to operate efficiently, or when the user is simply unable to speak, the keyboard may provide a more efficient tool to interfacing with the procurement system. In addition, example embodiments are not limited to the first interface 200 as being a voice-to-text converter, a keyboard, or a combination thereof. For example, the first interface may be a touch screen.

In FIG. 1 a user 100 is shown interacting with the first interface 200. In example embodiments, the user may enter a command (example: "show me the top ten suppliers for MRO") or enter a question (example: "which are the top ten suppliers for MRO?"). In example embodiments, because the first interface 200 may be equipped with a voice-to-text converter, a user may enter the command or question verbally. However, example embodiments are not limited thereto. For example, because the first interface 200 may include a keyboard, the user may, alternatively, type the command or question.

As outlined above, the first interface 200 may include a voice-to-text converter. For example, the first interface 200 may include a standard voice-to-text converter that may be used to convert voice and/or speech to text. In example embodiments, the converter may analyze the morphology of a voice and perform an extended semantic analysis for context independent meaning representation. In example embodiments, a voice processing algorithm may process individual words and analyze their components. In example embodiments, the non-word tokens (such as punctuation) may be separated from the words and linear sequences of words may be transformed into structures that show how the words relate to one another. This parsing step may convert the flat list of words of the sentence into a structure that defines the units represented by that list so as to convert them to meaningful text.

In example embodiments, the command module 300 may receive the text based input from the first interface 200. For example, the user 100 may verbally issue a question or command to the first interface 200 and the first interface 200 may convert the issued question or command into text which is then forwarded to the command module 300. In the alternative, the first interface 200 may receive a question or command from a user and via a keyboard and the first interface 200 may convert signals from the keyboard into text which is then forwarded to the command module 300.

In example embodiments, the command module 300 may parameterize the text on the basis of predefined command and parameter types to form a parameterized query. In example embodiments, the command module 300 may include a library or may connect to a library to assist in parameterizing the text. The library may, for example, be a database storing a plurality of words each of which may be associated with a parameter type. After forming the parameterized query, the command module 300 may send the parameterized query to the artificial intelligent search & match engine (AI Engine) 400. In example embodiments, the AI Engine 400 may be configured to compare and match the parameterized query firstly with a historical knowledge base that comprises queries and system response ID information associated with the queries. In the event a match of the parameterized query is not found with a query stored in the historical knowledge base, the AI engine 400 may interact with a query knowledge model set of a relevant sub-system or a plurality of query knowledge model sets.

When the AI Engine 400 is able to find a match with high confidence in historical knowledge base, the AI Engine 400 may then pass a system response ID associated with the matched query to the Response Solution Engine (RS Engine) 500. In case AI Engine 400 does not find a relevant match in historical knowledge base, it would search at least one query knowledge model set (for example, at least one of the Spend Query KM, the Sourcing Query KM, the Contracts Query KM, and the Performance Metric Query KM) to find a high confidence match. The AI Engine then would pass a system response ID associated with the matched query record of the at least one query knowledge model set to the RS Engine 500.

In example embodiments, the RS Engine 500 may apply user preferences and user specific data (corresponding to the user who is interacting with the system) to the query parameters and initiate the system action by interacting with sub-system and the related databases. For example, the RS Engine 500 may interact with one or more of the databases Spend DB, Sourcing DB, Contracts DB, Performance Metric DB, and P2B DB of the plurality of databases 600. The system actions initiated by the RS Engine 500 through any of the procurement sub-systems result as a system response that is either informative or actionable in nature. Thus the user is provided with a high confidence response to voice based query in a quick manner without the need to navigate through a procurement system.

The system also provides the ability to enhance the historical knowledge base for higher match accuracy by providing the user an opportunity to mark the system response as acceptable or not. Upon an acceptance of a response, the voice query and the response set may be included back in the historical knowledge base.

FIG. 2 shows an example of a detailed flow of operations performed by the first interface 200 and the command module 300. In particular, FIG. 2 discloses an example where the first interface 200 includes a voice-to-text converter. Furthermore, the example shows an example of the way a voice query is parameterized and optimized for better results. Referring to FIG. 2, the flow may begin with a first operation 301 where voice data is converted to text in a predefined generic method. That is, the voice/speech may be converted to text format using a standard speech to text converter that may be a part of the first interface 200. The converter may analyze a morphology of a voice and perform an extended semantic analysis for context and independent meaning representation. In example embodiments, a voice processing algorithm may process individual words and analyze their components, and non-word tokens (such as punctuation) may be separated from the words. In example embodiments, linear sequences of words may be transformed into structures that show how the words relate to one another. This parsing step converts the flat list of words of the sentence into a structure that defines the units represented by that list. These structures may be assigned meanings to build sentences. These sentences may then be executed as voice commands.

In example embodiments, the voice text may be broken into smaller words and the words may go through a matching process to see if the text query matches with known command queries of the command library as shown in 302. The text query matching operation of the command library may be executed by an artificial intelligence algorithm to identify a Module parameter signifying a specific knowledge model that can be further leveraged (in step 404) for processing of the query parameters. The identified knowledge model may act as the value for the Module Parameter. In the event the text query does not have a match in the command library, the system may inform the user 100 that the command does not exist and/or provide the user with a list of usable commands 303.

Further to a successful match of step 302, parameterization logic may be applied to text with the specified commands and parameter identifications process 304 may be started. In 304 the parameterization identification may be carried out across 5 different types parameters Category (example: MRO, IT suppliers), Module (example: spend, contract, performance metric, P2P (Procure-to-pay), RFx, Auction, event), Entity (Example: User, Supplier, item), Adjective (example: Top, Bottom, Best, Worst), & Regions (Example: APAC, Country, BU).

The following is a Query Parameterization example for the voice query "Show me the Top ten suppliers for MRO in Europe"

Parameterizations

TABLE 1

| Category | Module | Entity | Adjective | Regions |
|----------|--------|-----------|-----------|---------|
| MRO | Spend | Suppliers | Top | Europe |

After the text is parameterized into the 5 different parameters 306 a comparison and matching process may be executed 400.

In example embodiments, the procurement system may be configured to operate without having all of the parameters specified by the user. For example, in the event the user simply commanded the system to "show me the top suppliers for MRO" the system may be configured to ask the user to provide additional information such as the number of suppliers and/or the region to which the search is applicable. On the other hand, the system may be configured to operate with default values. For example, in the event the user does not specify a parameter, such as the "number" of top suppliers, the system may be configured to return the top 5 top suppliers. As another example, in the event the user fails to specify the region, the system may be configured to default to a certain region, such as Europe. In the event the text does not have a match in the command library 302, the procurement system may inform the user that the given command does not exist and may even give the user a list of commands 307.

The following example is used for the purpose of illustrating an example Command Library matching algorithm in accordance with example embodiments. In practice, the size of the library may be relatively large.

Table 2 represents a table of command descriptions and their associated modules. Tolken words from each of the command descriptions (i.e., common words such as "is", "are" and "of" are not considered as token words) are used to build a command training set (Table 3). The command training set may be conceptualized as a table including command key words from each search, target modules associated with each group of command key words, and a target module codes associated with each group of command key words.

TABLE 2

| Command Descriptions | Target Module |
|---|---|
| What is my spend on MRO in Europe | Spend |
| What are the current sourcing events | Sourcing |
| Who are my MRO suppliers in Europe | Spend |
| What are the identified savings from sourcing events | Sourcing |

Command Training Set

TABLE 3

| Command Key Words | Target Module | Target Module Code |
|---|---|---|
| What spend MRO Europe | Spend | 101 |
| What current sourcing events | Sourcing | 201 |
| Who MRO suppliers Europe | Spend | 101 |
| What identified savings sourcing events | Sourcing | 201 |

The command training set may be used to build a model set. The model set may be conceptualized as a table including a first column of words, a second column or corresponding target module codes, a third column of matches, and a fourth column of nonmatches. In example embodiments, the matches and non matches may be based on the frequency of occurrence of the given word within the set of words representing a given target module. Table 4 represents an example of a model set based on the training set of table 4.

TABLE 4

| Words | Target Module code | Matches | Non Matches |
|---|---|---|---|
| what | 101 | 1 | 7 |
| spend | 101 | 1 | 7 |
| MRO | 101 | 2 | 6 |
| Europe | 101 | 2 | 6 |
| what | 201 | 2 | 7 |
| current | 201 | 1 | 8 |
| sourcing | 201 | 2 | 7 |
| events | 201 | 2 | 7 |
| who | 101 | 1 | 7 |
| MRO | 101 | 2 | 6 |
| suppliers | 101 | 1 | 7 |
| Europe | 101 | 2 | 6 |
| what | 201 | 2 | 7 |
| identified | 201 | 1 | 8 |
| savings | 201 | 1 | 8 |
| sourcing | 201 | 2 | 7 |
| events | 201 | 2 | 7 |

The following represents an example algorithm usable for building a model set from a command training set.

START (Note: the column titles of the model set are Words, Target Module Code, Matches, and NonMatches)
    Step 1.a: Determine the frequencies for each combination of a word 'i' and a Target Module Code 'j' (TMC_j) in the training set. Call it Freq_Word_ij.
    Step 1.b: Determine the sum of frequencies Freq_Word_ij of each word of TMC_j Call it Tot_Freq_TMC_j.
    Step 2:    Read first command key words Command_Key_1 from the training set
        Step a:    Name the corresponding target module code as TMC_1
        Step b:    Read the first word Word_1 of the description Command_Key_1 and calculate the Matches and NonMatches of Word_1 from the training set
            Step i:    Determine the frequency of first word Word_1 of TMC_1. Call it Freq_Word_11. This quantity is Matches for the pair of Word_1 and TMC_1 Matches = Freq_Word_11
            Step ii:    NonMatches for the pair of word Word_1 and category TMC_1 is given by: NonMatches= Tot_Freq_TMC_1 − Matches
        Step c:    Read next word of the Command_Key_1
            Step i: Name this word as Word_2
            Step ii: Repeat the steps i to ii of step b
    Step 3:    Read the next item description Command_Key_2 from the training set
        Step a:    IF NOT (The corresponding target module code is TMC_1) THEN name it as TMC_2 and repeat step 2
            ELSE TMC_1, repeat step 2 (b), (c)
    Step 4:    Repeat the step 3 for each of the item descriptions in the training set one by one.
        STOP The following is an example algorithm usable for identifying a Module parameter for a given voice text query

```
START
Step 1: Calculate probability of the voice text query voice_text being a
representative query of the first Target Module with Target Module Code
TMC_1.
    Step a: Calculate prior for TMC_1: P (TMC_1).
        Step i: This is equal to the ratio of total frequency of
        category TMC_1 with the total frequency of all categories in the
        model set.
    Step b: Calculate P (W1/ TMC_1) where W1 is the first word of
the Voice_text.
        IF (The pair of W1 and TMC_1 is found in the model set)
        THEN Prob_Word_1= [Matches/ (Matches + NonMatches)]
        ELSE Prob_Word_1 = an insignificant nonzero quantity.
    Step c: Repeat the Step 'c' for each word of a given description
Voice_text
    Step d: Calculate posteriori probability P (First Code/ First
Description).
        Step i: Multiply the probability of each word of the item
        description Voice_text for a given category TMC_1. Call this
        resulted number as Prob_Word
        Step ii: Multiply the P (TMC_1) with Prob_Word
        Step iii: The resulted number is named as P
        (TMC_1/Voice_text)
Step 2: Calculate probability of Voice_text categorized in next Target
Module Code.
    Step a: Repeat the step 1.
Step 3: Sort all the target module codes in descending order of P
(TMC_i/Voice_text) probabilities.
Step 4: Assign first target module code (The one associated with highest
probability) to the Voice_text. Identify the description of this target
module code as TMC_Desc_1
Step 5: Calculate Match Factor for the Voice_text.
    Step a: Determine the number of words in the item description
Voice_text. Name this parameter as Tot_Words_Voice_text
    Step b: Determine the number of words of Voice_text matches
with the group of words of TMC_Desc_1, Name this parameter as
Match_Words_TMC_Desc_1
    Step c: The match factor is the ratio of
Match_Words_TMC_Desc_1 with Tot_Words_Voice_text.
Match Factor = Match_Words_TMC_Desc_1 /
Tot_Words_Voice_text
STOP
```

As outlined above, the training set may include three columns: Command descriptions, Target Module, and Target Module Code. The data model generation may include four columns: word, target module code, Matches and Non-Matches. The target module may be identified on the basis of the highest match factor of the given query to any of the given command descriptions. It is also noted that the above method is exemplary in nature and not meant to limit the invention.

FIG. 3 shows an example of a flow of the intelligent search & match engine and the knowledge model process in accordance with example embodiments. After the parameterization in 305 the parameters are picked up by the intelligent search a match engine 400.

Referring to FIG. 3, after the user's query/command parameterized, it is ready for a comparison and search process 401 that may be performed by the intelligent search and match engine 400. In example embodiments, the intelligent search and match engine 400 may first check the query match with the historical knowledge base of queries and responses 402. In example embodiments, the historical knowledge base collects all the previously executed queries across various modules and stores them to enhance performance and speed. These queries and responses are well indexed to enhance performance.

In example embodiments, the procurement system may check the historical knowledge base for a query that matches a query provided by a user 403. If there is a matching query, the procurement system checks to see if certainty of the match meets or exceeds a first value, for example, 100% 405. If the certainty of the match meets for exceeds the first value, then a system action is initiated with identified parameters 406. For example, the system action may include sending a response ID information to the response solution engine 500. In example embodiments, all parameters may need to be the same for it to match 100% (an example of the first value). In case there is a 100% match, the intelligent search and match engine 400 may generate a system action with the parameters for the response engine 500 thus initiating the response engine 500.

In example embodiments, the historical knowledge base 403 may be built by forming an initial training set of natural language text queries along with corresponding system response information and analyzing and processing the collection of natural language text queries in the training set to build the historical knowledge base. In example embodiments, the analyzing and processing step may be implemented by searching each of the natural language text queries for at least one command word. This searching may be accomplished by comparing words in the natural language text queries to a command library and, in the event a word in the natural language text query is identified as a command word, identifying the word as a command. In example embodiments, the analyzing and processing step may further include parameterizing the additional words in the natural language text queries as at least one of a category, a module, an adjective an entity, number and a region. In example embodiments, the analyzing and processing step may be further implemented by storing the command, the parameterized additional words, and the identified response ID as a record set of the historical knowledge base.

Table 5 represents a nonlimiting example embodiment of a training set usable for forming the historical knowledge base. As shown in Table 5, and described above, the training set comprises a list of natural language text queries along with system response information.

TABLE 5

| Query | Response ID Information |
|---|---|
| What is my spend for the flavors category? | 1013 |
| List the contracts that are expiring in the next 90 days | 4078 |
| Who are the bottom suppliers below set performance measure? | 3134 |
| Show me the invoices reaching payment due date within the next 15 days | 6543 |
| List the sourcing events for office supplies Category in North America | 2098 |
| Show me the top 5 suppliers for MRO in North America. | 1002 |

In example embodiments, each of the queries may be searched for words that may be a command or a parameter. For example, each of the elements of the queries provided in the training set of Table 5 may be analyzed to produce the following historical knowledge model illustrated in Table 6.

TABLE 6

| Reference | Command | Category | Entity | Adjective | Region | ID |
|---|---|---|---|---|---|---|
| 1 | Show | Flavors | Suppliers | Top | — | 1013 |
| 2 | List | — | Contracts | Next 90 | — | 4078 |
| 3 | Who | — | Suppliers | Bottom | — | 3134 |
| 4 | Show | — | Invoices | Next 15 | — | 6543 |

TABLE 6-continued

| Reference | Command | Category | Entity | Adjective | Region | ID |
|---|---|---|---|---|---|---|
| 5 | List | Office Supplies | Sourcing events | — | North America | 2098 |
| 6 | Show | MRO | Suppliers | Top | North America | 1002 |

In example embodiments, the historical knowledge model shown in Table 6 may be used to determine a response ID associated with a query from a user. For example, suppose a user provides the following query to the procurement system: Show me the top suppliers of MRO for North America. In example embodiments, the procurement system would categorize various elements of the query into a command and/or parameters. For example, in this case, the procurement system would identify the term Show as a command, and the terms top, suppliers, MRO, and North America as parameters. More specifically, the procurement system would identify the term top as an adjective, the term suppliers as an entity, the term MRO as a category, and the term North America as a region. After categorizing the various query elements, the procurement system would compare the elements of the query with those in the historical knowledge model to determine which of the references in the historical knowledge model most closely matches the user's query. For example, the procurement system may compare the command associated with the query with the command in the historical knowledge model. In addition, the procurement system may also determine how many of the parameters of the query match the parameters of the knowledge model.

Table 7 provides an example illustration of the instant method. Table 7 is essentially a reproduction of Table 6, however, in Table 7, one column indicating a quality of match between elements of the parameterized query and the knowledge model is provided. For example, when the elements of the parameterized query are compared against the elements of the first reference of the historical knowledge model it is noted that each of the command, the entity, and the adjective match. Thus, a total of three (command, entity, adjective) out of five variables (command, category, entity, adjective, and region) match providing a percent match of 60%. When the elements of the parameterized query are compared against the elements of the second reference of the historical knowledge model it is noted none of the command, category, entity, adjective, and region match. Thus, zero out of five variables match providing a zero percent match. Likewise the elements of the parameterized query are compared against the elements of the third reference of the historical knowledge model it is noted only the entity between the query and the third reference of the historical knowledge model matches. Thus, only one of five variables matches providing a percent match of 20%. This matching process is repeated for all of the references in the historical knowledge model.

TABLE 7

| Reference | Command | Category | Entity | Adjective | Region | Percent Match |
|---|---|---|---|---|---|---|
| 1 | Show | Flavors | Suppliers | Top | — | 60 |
| 2 | List | — | Contracts | Next 90 | — | 0 |
| 3 | Who | — | Suppliers | Bottom | — | 20 |
| 4 | Show | — | Invoices | Next 15 | — | 20 |
| 5 | List | Office Supplies | Sourcing events | — | North America | 20 |

TABLE 7-continued

| Reference | Command | Category | Entity | Adjective | Region | Percent Match |
|---|---|---|---|---|---|---|
| 6 | Show | MRO | Suppliers | Top | North America | 100 |

In example embodiments, if a user provided query matches 100% with a reference query of the historical knowledge model, then the response ID information of the reference query is forwarded to the response solution engine 500 for subsequent operations (to be explained later). For example, in the above matching, the sixth reference has a 100% match. Thus, the response ID information sent to the response solution engine would be 1002 (see table 6).

If there is no matching query in the historical database or the query does not provide a match at the first value, the intelligent search and match engine 400 may check if the module parameter exists 404. If the module parameter exists then the intelligent search and match engine 400 may look up the knowledge model set for a match 408. If the module parameter does not exist, then the intelligent search and match engine 400 pushes the query to all knowledge models to search for the best knowledge model entry 407.

In example embodiments, the intelligent search match engine 400 checks if there are matching knowledge model entries across multiple knowledge models 409. If yes, the intelligent search and match engine 400 combines these multiple knowledge models entries 410 and maps a system response id to the entries 413. If the query does not have a match in the multiple modules, the intelligent search and match engine 400 determines if the match confidence percentage is above a certain value 411, for example, 60% or above.

In example embodiments, a confidence shows the accuracy of the query and knowledge model match and would result in a more relevant response if the accuracy is high. Both operations 408 and 407 may go through the decision process for an accuracy check 411 which, in case the confidence is lower than the value, for example, 60%, the query is returned back to the user by the system with a message such as "No parameter match found. Please provide a new query." If the match confidence is above the value, for example, 60%, the engine maps a system response id to the entry and pushes it to the response solution engine 413.

As alluded to above, a query put forth by a user may be categorized and analyzed in order to determine a proper system response id for the query. The following is an example of how a query may be categorized and analyzed for a production of the proper system response id.

In example embodiments, a training set may be provided in order to determine a proper response id of a voice query. The training set may be comprised of a plurality of queries, a module ID for each of the queries, and a response ID of each of the queries. Table 8, provides a nonlimiting example of a training set associated with a spend query knowledge model.

TABLE 8

| Query | Module | Response ID Information |
|---|---|---|
| Show me the top suppliers for MRO? | Spend | 1001 |
| Who are the top suppliers for MRO? | Spend | 1001 |
| Show me the top suppliers for MRO in North America. | Spend | 1002 |

TABLE 8-continued

| Query | Module | Response ID Information |
|---|---|---|
| Who are the top suppliers for MRO in North America? | Spend | 1002 |
| List the top suppliers related to Office Supplies. | Spend | 1003 |
| Who are my suppliers in IT? | Spend | 1004 |

In example embodiments, the training set of FIG. 8 may be used to form a model set. For example, each of the elements of the queries in the training set may be analyzed and categorized into one of the aforementioned parameters. For example, the training set of Table 8 may be used for form a spend model set as shown in Table 9.

TABLE 9

| Reference | Command | Adjective | Entity | Category | Region | Response ID |
|---|---|---|---|---|---|---|
| 1 | Show | Top | Suppliers | MRO | | 1001 |
| 2 | Who | Top | Suppliers | MRO | | 1001 |
| 3 | Show | Top | Suppliers | MRO | North America | 1002 |
| 4 | Who | Top | Suppliers | MRO | North America | 1002 |

TABLE 9-continued

| Reference | Command | Adjective | Entity | Category | Region | Response ID |
|---|---|---|---|---|---|---|
| 5 | List | Top | Suppliers | Office Supplies | | 1003 |
| 6 | Who | | Suppliers | IT | | 1004 |

In example embodiments, the spend model set shown in Table 9 may be used to determine a response ID associated with a query from a user. For example, suppose a user provides the following query to the procurement system: Who are the suppliers of MRO for North America. In example embodiments, the procurement system would categorize various elements of the query into a command and/or parameters. For example, in this case, the procurement system would identify the term Who as a command, and the terms suppliers, MRO, and North America as parameters. More specifically, the procurement system would identify the term suppliers as an entity, the term MRO as a category, and the term North America as a region. After categorizing the various query elements, the procurement system would compare the elements of the query with those in a model set to determine which of the reference in the model set most closely matches the user's query. For example, the procurement system may compare the command associated with the query with the command in the knowledge model the spend model. In addition, the procurement system may also determine how many of the parameters of the query match the parameters of the knowledge model.

Table 10 provides an illustration of the instant method, which is only an example of the invention. Table 10 is essentially a reproduction of Table 9, however, in Table 10, three columns indicating a quality of match between elements of the parameterized query and the model set is provided. For example, when the elements of the parameterized query are compared against the elements of the first reference of the knowledge model it is noted that the command of the query does not match the command of the first reference, thus, the command match column entry for the first reference is 0. However, it is also noted that two of the parameters of the parameterized query (supplier=entity, MRO=category) match two of the parameters of the first reference. Thus, the parameter match column entry for the first reference is 2. Furthermore, since of total of four parameters are provided in the spend knowledge model (Adjective, Entity, Category, and Region) the parameter match for entry for the first reference is 50% (=2/4).

TABLE 10

| Reference | Command | Adjective | Entity | Category | Region | Command Matches | Parameter Matches | Parameter Match |
|---|---|---|---|---|---|---|---|---|
| 1 | Show | Top | Suppliers | MRO | | 0 | 2 | 50% |
| 2 | Who | Top | Suppliers | MRO | | 1 | 2 | 50% |
| 3 | Show | Top | Suppliers | MRO | North America | 0 | 3 | 75% |
| 4 | Who | Top | Suppliers | MRO | North America | 1 | 3 | 75% |
| 5 | List | Top | Suppliers | Office Supplies | | 0 | 1 | 25% |
| 6 | Who | | Suppliers | IT | | 1 | 1 | 25% |

Referring to Table 10 it is noted that the reference providing the best match is reference 4. Thus, in this example, the response associated with reference 4 would be forwarded to the response solution engine 500 for a subsequent operation.

FIG. 4 shows the process of the response solution engine 500 and its output to a second user interface 700. In example embodiments, the system response id for the matched entry Knowledge Model and the parameters may be pushed into the response solutions engine 501. The response solution engine 500 identifies the system to which it needs to execute the programming logic using the module parameter and the matched entry knowledge model 502. The request is moved to the module systems and databases which processes the response id, parameters & the matched knowledge model 503. The engine 500 then checks if the parameters are sufficient to generate a response 504. If "No" the system responds to the user saying "No parameter match found. Please provide a new query" 505. If the parameters are sufficient, enough the response thus generated is shown to the user in the user interface 506. This is then stored on successful user acknowledgement in the historical knowledge base 400 which may be the key repository of the previous queries and responses.

In example embodiments, the instant system may form an extensive computer interface with operations performed over a network. For example, the first interface 200 may be a portal such as a personal computer wherein the personal computer has at least one of a voice converter and a keyboard. The computer may analyze instructions provided by a user and then send the instructions to a network computer which includes the command module 300, the intelligent search and match engine 400, the response solution engine 500, and the plurality of databases 600. The second interface in this system may be the same as the first interface 200, which may be the aforementioned portal. In the alternative, the first interface may be a telephone, for example, a cell phone, that may call into a service that implements the above system. In this case, the service may respond to the user by converting results from the queries to an electronic voice so that the listener may hear the results. In the alternative, the system may be configured to send text messages and/or an email to the user and/or may be configured to receive text messages and/or email.

While example embodiments have been particularly shown and described with reference to example embodiments thereof, it will be understood by those of ordinary skill in the art that various changes in form and details may be made therein without departing from the spirit and scope of the invention.

What we claim is:

1. A system for building a query knowledge model using natural language based text, the system comprising:
   a processor configured to
   a. form an initial training set by compiling a collection of natural language text queries and corresponding system response information related to a sub system; and
   b. build the query knowledge model by analyzing and processing the collection of natural language text queries in the initial training set by
      i. searching a natural language text query of the collection of natural language text queries for at least one command word by comparing words in the natural language text query to a command library and, in the event a word in the natural language text query is identified as a command word, identifying the word as a command,
      ii. parameterizing additional words in the natural language text query as at least one of a category, a module, an adjective, an entity, and a region,
      iii. identifying a response ID of the natural language text query,
      iv. storing the command, the parameterized additional words, and the identified response ID as a record set of the query knowledge model, and
      v. repeating the steps i-iv for each of the remaining natural language text queries of the collection of natural language text queries to create the query knowledge model based out of the initial training set.

2. The system of claim 1, wherein the processor is configured to build at least one of a spend analysis function specific, Spend Query Knowledge Model, a sourcing function specific, Sourcing Query Knowledge Model, an organizational performance metric based Performance Metric Query Knowledge Model, a contract management function specific, Contract Query Knowledge Model, a Procure-to-pay function specific, Procure-to-pay Query Knowledge Model, and a Supplier base management function specific, Supplier Base Query Knowledge Model.

3. A system for building a historical knowledge base, the system comprising:
   a processor configured to
   a. form an initial training set by compiling a collection of natural language text queries and corresponding system response information; and
   b. build the historical knowledge base query knowledge model by analyzing and processing the collection of natural language text queries in the initial training set by
      i. searching a natural language text query of the collection of natural language text queries for at least one command word by comparing words in the natural language text query to a command library and, in the event a word in the natural language text query is identified as a command word, identifying the word as a command,
      ii. parameterizing additional words in the natural language text query as at least one of a category, a module, an adjective, an entity, and a region,
      iii. identifying a response ID of the natural language text query,
      iv. storing the command, the parameterized additional words, and
   the identified response ID as a record set of the historical knowledge base, and
      v. repeating steps i-iv for each of the remaining natural language text queries of the collection of natural language text queries to create the historical knowledge base based out of the initial training set.

4. A procurement system comprising:
   a processor configured to
   a. convert a voice query to text using a speech to text converter;
   b. analyze the text and parsing the text into words;
   c. refer to a command library to identify the words as one of commands and parameters, wherein the parameters include at least one of a category parameter, a module parameter, an adjective parameter, an entity parameter, and a region parameter;
   d. form an initial training set by compiling a collection of natural language text queries and corresponding system response information related to a sub system; and
   e. build a query knowledge model by analyzing and processing the collection of natural language text queries in the initial training set by
      i. searching a natural language text query of the collection of natural language text queries for at least one command word by comparing words in the natural language text query to a command library and, in the event a word in the natural language text query is identified as a command word, identifying the word as a command,
      ii. parameterizing additional words in the natural language text query as at least one of a category, a module, an adjective, an entity, and a region,
      iii. identifying a response ID of the natural language text query,
      iv. storing the command, the parameterized additional words, and
   the identified response ID as a record set of the query knowledge model, and
      v. repeating steps i-iv for each of the remaining natural language text queries of the collection of natural language text queries to create the query knowledge model based out of the initial training set.

5. A procurement system comprising:

a processor configured to
- a. convert a voice query to text using a speech to text converter;
- b. analyze the text and parsing the text into words;
- c. refer to a command library to identify the words as one of commands and parameters, wherein the parameters include at least one of a category parameter, a module parameter, an adjective parameter, an entity parameter, and a region parameter;
- d. form an initial training set by compiling a collection of natural language text queries and corresponding system response information; and
- e. build a historical knowledge base query knowledge model by analyzing and processing the collection of natural language text queries in the initial training set by
  - i. searching a natural language text query of the collection of natural language text queries for at least one command word by comparing words in the natural language text query to a command library and, in the event a word in the natural language text query is identified as a command word, identifying the word as a command,
  - ii. parameterizing additional words in the natural language text query as at least one of a category, a module, an adjective, an entity, and a region,
  - iii. identifying a response ID of the natural language text query,
  - iv. storing the command, the parameterized additional words, and the identified response ID as a record set of the historical knowledge base, and
  - v. repeating steps i-iv for each of the remaining natural language text queries of the collection of natural language text queries to create the historical knowledge base based out of the initial training set.

* * * * *